United States Patent
Bjersing (10) Patent No.: US 10,282,985 B2
(45) Date of Patent: May 7, 2019

(54) METHOD AND SYSTEM FOR ENABLING A VEHICLE TO DISCARD NON-PERTINENT ROAD SIGN INFORMATION

(71) Applicant: VOLVO CAR CORPORATION, Gothenburg (SE)

(72) Inventor: Henrik Bjersing, Vastra Frolunda (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/693,867

(22) Filed: Sep. 1, 2017

(65) Prior Publication Data

US 2018/0068559 A1 Mar. 8, 2018

(30) Foreign Application Priority Data

Sep. 2, 2016 (EP) .................................. 16187006

(51) Int. Cl.
*G08G 1/0962* (2006.01)
*G06K 9/00* (2006.01)
(Continued)

(52) U.S. Cl.
CPC ....... *G08G 1/09623* (2013.01); *B60W 30/146* (2013.01); *G06K 9/00818* (2013.01);
(Continued)

(58) Field of Classification Search
CPC ............... G08G 1/09623; G08G 1/091; G08G 1/09675; G08G 1/096725;
(Continued)

(56) References Cited

U.S. PATENT DOCUMENTS

2013/0049988 A1* 2/2013 Roeber .............. G08G 1/09623
340/905
2014/0119605 A1* 5/2014 Zobel ................. G06K 9/00818
382/103
2015/0170511 A1* 6/2015 Bauer ................ G06K 9/00818
701/1

FOREIGN PATENT DOCUMENTS

DE 102012024613 6/2014
DE 102012025067 6/2014
DE 102014044623 9/2014

OTHER PUBLICATIONS

Extended European Search Report for European Application No. EP 16187006.8, Completed by the European Patent Office, dated May 15, 2017, 10 Pages.

* cited by examiner

*Primary Examiner* — Muhammad Shafi
(74) *Attorney, Agent, or Firm* — Brooks Kushman P.C.

(57) ABSTRACT

A method performed by a sign pertinence receiving system is disclosed for enabling a first vehicle to discard non-pertinent road sign information. The first vehicle is configured to present extracted sign information within the vehicle and/or adapt a vehicle function based on detected sign information. The system captures detected sign information from a road sign, and receives a most likely supplementary information estimate indicating supplementary information deemed to pertain to the road sign, which estimate is based on detected supplementary information captured by a second vehicle from supplementary sign information assigned to the road sign, wherein a correctness confidence value associated with the estimate exceeds a minimum correctness confidence threshold. The system determines whether the estimate pertains to the first vehicle, and refrains from presenting extracted sign information and/or from adapting a vehicle function, provided the estimate is determined to not pertain to the first vehicle.

12 Claims, 5 Drawing Sheets

(51) Int. Cl.
*G08G 1/0967* (2006.01)
*B60W 30/14* (2006.01)
*G06K 9/62* (2006.01)
*G08G 1/09* (2006.01)

(52) U.S. Cl.
CPC ........... *G06K 9/6228* (2013.01); *G08G 1/091* (2013.01); *G08G 1/09675* (2013.01); *G08G 1/096725* (2013.01); *G08G 1/096791* (2013.01); *B60W 2550/22* (2013.01); *B60W 2550/408* (2013.01); *B60W 2720/10* (2013.01)

(58) Field of Classification Search
CPC .......... G08G 1/096791; B60W 30/146; B60W 2720/10; B60W 2550/22; B60W 2550/408; G06K 9/6228; G06K 9/00818
USPC .......................................................... 701/93
See application file for complete search history.

METHOD AND SYSTEM FOR ENABLING A VEHICLE TO DISCARD NON-PERTINENT ROAD SIGN INFORMATION

CROSS-REFERENCE TO RELATED APPLICATIONS

This application claims foreign priority benefits under 35 U.S.C. § 119(a)-(d) to European patent application number EP 16187006.8, filed Sep. 2, 2016, which is incorporated herein by reference in its entirety.

TECHNICAL FIELD

The present disclosure relates to a sign pertinence receiving system adapted or configured to be on-board a vehicle, and a method performed therein, for enabling the vehicle to discard non-pertinent road sign information.

BACKGROUND

In order to support a driver of a motor vehicle in fulfilling his tasks in road traffic, it is commonly known that a vehicle—e.g. a passenger car—may be adapted or configured for presenting extracted sign information within the vehicle and/or adapting one or more vehicle functions based on detected sign information captured by an image capturing device on-board the vehicle from sign information presented on a road sign detectable by the vehicle. In this manner—should the road sign refer to for instance a speed limit sign—an interpreted speed limit value may conveniently be presented on e.g. a display within the vehicle and/or a vehicle speed may conveniently be adapted in consideration of the detected speed limit. A road sign may however further have assigned thereto a supplementary sign, which commonly is represented by e.g. a small rectangular sign beneath the main road sign. A supplementary sign may for instance state "tractor", thus indicating that the road sign to which the supplementary sign is assigned pertains only to e.g. tractors, and not to e.g. passenger cars. Determining which sign information that pertains to a vehicle and which does not is however challenging, and it is not uncommon that in e.g. a passenger car, an interpreted speed limit value is presented and/or a vehicle speed is adapted in consideration of the detected speed limit, despite of the fact that the speed limit does not pertain to said passenger car. US 2013/0049988 for instance, relates to traffic sign recognition, and discloses how an optical system on-board the vehicle detects the traffic sign and determines information related to the sign, how driving maneuvers carried out by the vehicle are monitored to determine driving situation information, and further how the driving situation information and the traffic sign information are used to determine a probability that the sign is pertinent for the vehicle under the current driving conditions. If the probability is above a threshold, the driver is alerted to the traffic sign. However, although US 2013/0049988 determines whether or not to alert a driver of a vehicle to the presence of a traffic sign in the vehicle's driving environment, the challenge of determining which sign information that pertains to a vehicle and which does not, still remains. For instance, such an image capturing device on-board a vehicle discussed above—e.g. represented by a camera—commonly have detection difficulties in a number of environmental conditions such as in heavy rain or snow, fog or direct sunlight etc., and/or if a road sign is at least partly covered by e.g. dirt and/or positioned at the edge of the camera view. Not in least when it comes to supplementary signs and/or supplementary sign information may said detection difficulties be especially challenging, thus rendering that a vehicle incorrectly may present and/or adapt to road sign information actually non-pertinent to said vehicle.

SUMMARY

It is therefore an object of embodiments herein to enable a vehicle to discard non-pertinent road sign information. According to a first embodiment herein, the object is achieved by a method performed by a sign pertinence receiving system on-board a first vehicle for enabling the first vehicle to discard non-pertinent road sign information. The first vehicle—which may be referred to as a receiving vehicle—is adapted or configured for presenting extracted sign information within the first vehicle and/or adapting one or more vehicle functions based on detected sign information captured by means of one or more image capturing devices on-board the first vehicle from at least a portion of sign information presented on a road sign detectable by said first vehicle. The sign pertinence receiving system captures first detected sign information from a first road sign. The sign pertinence receiving system further receives a most likely supplementary information estimate indicating supplementary information deemed to pertain to the road sign, which most likely supplementary information estimate is based on detected supplementary information captured by at least one second vehicle from supplementary sign information assigned to the first road sign. A correctness confidence value associated with the most likely supplementary information estimate exceeds a minimum correctness confidence threshold. Moreover, the sign pertinence receiving system determines whether the most likely supplementary information estimate pertains to the first vehicle. The sign pertinence receiving system refrains from said presenting extracted sign information and/or from said adapting one or more vehicle functions, provided that the most likely supplementary information estimate is determined to not pertain to the first vehicle.

Thereby, an approach is provided according to which road sign information considered irrelevant to said first vehicle, is ignored. That is, since the first vehicle is adapted or configured for presenting extracted sign information within said first vehicle and/or adapting one or more vehicle functions based on detected sign information captured by means of one or more image capturing devices on-board the first vehicle from at least a portion of sign information presented on a road sign detectable by the first vehicle, said first vehicle is configured to take action in consideration of the detected sign information. Moreover, since first detected sign information is captured from a first road sign, content featured and/or provided on a first sign within detectable range of said first vehicle, is derived by the first vehicle. Furthermore, since there is received a most likely supplementary information estimate indicating supplementary information deemed to pertain to the first road sign, which most likely supplementary information estimate is based on detected supplementary information captured by at least one second vehicle from supplementary sign information assigned to the first road sign, detected supplementary information related to the first road sign—captured by one or more other vehicles and subsequently evaluated for determination of the most likely supplementary information alternative—is received by the first vehicle. Thereby, the first vehicle is informed of detected supplementary information associated with the first road sign captured by at least one other vehicle which has also passed by and captured supplementary sign information of the first road sign, for instance during favourable weather conditions. The at least one other vehicle may have passed by and captured the supplementary sign information of the first road sign before or substantially at the same time as the first vehicle passes by the first road sign. Furthermore, since a correctness confidence value associated with the most likely supplementary information estimate moreover exceeds a minimum correctness confidence threshold, it is provided that the most likely supplementary information estimate has been deemed—e.g. by a sign pertinence evaluating system—to pertain to the first road sign, with a satisfying confidence level. Accordingly, it is ensured that only a most likely supplementary information estimate of high enough confidence is provided to the first vehicle. Moreover, since it is further determined whether the most likely supplementary estimate pertains to the first vehicle, it is established if said estimate—and subsequently the sign information and/or the road sign—is deemed to be valid for the first vehicle. Furthermore, since the first vehicle is refrained from said presenting extracted sign information and/or from said adapting one or more vehicle functions, provided that the most likely supplementary information estimate is determined to not pertain to the first vehicle, the first vehicle may discard the detected sign information of the first road sign should the most likely supplementary information estimate indicate that the sign information of the first road sign is irrelevant to the first vehicle. Consequently, by taking into consideration the most likely supplementary information estimate rather than, and/or as a complement to, by the first vehicle captured supplementary sign information which potentially erroneously—e.g. during unfavourable conditions—may indicate that the sign information and/or road sign does pertain to the first vehicle when it in fact—and as may be indicated by the most likely supplementary information estimate—does not, there is less risk of the first vehicle erroneously presenting extracted sign information non-pertinent to said vehicle and/or less risk of erroneously adapting one or more vehicle functions based on sign information non-pertinent to said first vehicle. For that reason, an approach is provided for enabling a vehicle to discard non-pertinent road sign information. The technical features and corresponding advantages of the above mentioned method will be discussed in further detail in the following.

By introducing a method performed by a sign pertinence receiving system on-board a first vehicle for enabling the vehicle to discard non-pertinent road sign information, an approach is provided according to which road sign information considered irrelevant to said first vehicle, is ignored. The expression "for enabling the first vehicle to discard non-pertinent road sign information" may in this context refer to "for preventing said first vehicle from presenting and/or adapting to road sign information non-pertinent to said first vehicle", "for enabling the first vehicle to discard non-pertinent road sign information in an improved and/or alternative manner", "for handling of road sign information pertinence", "for enabling said first vehicle to consider road sign information pertinence", "for enabling selective handling of road sign information", and/or "for enabling suppression of sign information not pertaining to said first vehicle". Moreover, "road sign" may refer to a permanent or temporary "traffic sign", and further to a sign erected at the side of—or above—a road to give instructions or provide a warning or information to road users, for instance a speed limit. "Enabling" may refer to "supporting", whereas "discard" may refer to "ignore", "suppress", "delete", and/or "refraining from utilizing and/or consider". The expression "non-pertinent road sign information" may refer to "road sign information non-pertinent to said first vehicle", "road sign information deemed, considered and/or established to be non-pertinent to said first vehicle", and/or "road sign information irrelevant and/or invalid for said first vehicle". Furthermore, "pertinence" may throughout this disclosure refer to "relevance" and/or "validity", whereas "road sign information" may refer to "road sign content" and/or "road sign numbers, letters, symbols, text and/or pattern(s)". The road sign information may comprise any arbitrary combination of e.g. numbers, letters and/or symbols. "First vehicle" may refer to "at least a first vehicle". Moreover, "vehicle" may refer to any arbitrary vehicle, and may for instance refer to an engine-propelled vehicle, such as a car, truck, lorry, van, bus, motor cycle, scooter, tractor, military vehicle, etc. The vehicle may further be represented by an at least semi-autonomous vehicle supporting a varying level of automation, e.g. as commonly known, a varying level of vehicle speed control automation such as speed adaptation and/or speed limit adaptation. Moreover, "vehicle" may refer to "vehicle supporting one or more vehicle functions". The expression vehicle "function" may throughout this disclosure refer to vehicle "system" and/or vehicle "feature", whereas the expression "vehicle function" throughout may refer to "driver support function" and/or "driver assist function", and relate for instance to vehicle speed. "Driver assist functions" may as commonly known in the art relate to safety features designed to assist a driver in routine driving tasks such as safely moderating vehicle speed and/or maintaining proper lane positioning. Furthermore, the "sign pertinence receiving system" may fully or at least partly be comprised in, be integrated with and/or be connected to the vehicle, for instance be distributed between one or more vehicle nodes, such as ECUs ("Electronic Control Units"). Additionally or alternatively, the sign pertinence receiving system may at least partly be comprised in a mobile device integrated with, connected to and/or carried on-board the first vehicle, which mobile device for instance may refer to a multi-functional smart phone, mobile phone, mobile terminal or wireless terminal, portable computer such as a laptop, PDA or tablet computer, tablet such as an iPad, Pocket PC, and/or mobile navigation device. The first vehicle and/or the optional mobile device may be adapted or configured to have online abilities, as commonly known in the art, for instance to be able to communicate with a system adapted or configured to communicate with one or more vehicles. Said system adapted or configured to communicate with one or more vehicles, may refer to, comprise and/or be comprised in one or more remote commonly known servers and/or "clouds"—also referred to as "automotive clouds" and/or "automotive cloud network"—adapted or configured for storage and/or cloud-based storage and for wirelessly transmitting data to, and/or receiving data from, vehicles. The system adapted or configured to communicate with one or more vehicles, and/or the one or more servers and/or clouds may further comprise, be comprised in, be associated with and/or constitute a vehicle management system adapted or configured to wirelessly communicate with vehicles, remotely control functionality of the vehicles and/or hold information associated with the vehicles; for instance a vehicle management system such as e.g. Volvo On Call. Moreover, the first vehicle—and/or the optional mobile device—may further be adapted or configured to determine its respective position, e.g. geographical position, as commonly known in the art, such as with support from a positioning system and/or digital map data, and further to provide said position—as commonly known—to the system adapted or configured to communicate with one or more vehicles discussed above.

Since the first vehicle is adapted or configured for presenting extracted sign information within said first vehicle and/or adapting one or more vehicle functions based on detected sign information captured by means of one or more image capturing devices on-board the first vehicle from at least a portion of sign information presented on a road sign detectable by the first vehicle, said vehicle is configured to take action in consideration of the detected sign information, as commonly known in the art. For instance, the extracted sign information may for instance indicate the speed limit value "90" on a display within the first vehicle and/or the first vehicle may for instance adjust its speed to 90 km/h, should the road sign be represented by a 90 km/h speed limit sign and/or the road sign information present the speed limit "90". "Presenting" extracted sign information may throughout the disclosure refer to "displaying", "announcing", and/ or "audibly and/or visually presenting" extracted sign information, and said presenting may for instance be accomplished as commonly known with support from one or more displays and/or one or more loudspeakers. Moreover, "extracted" sign information may throughout refer to "rendered", "interpreted", "derived" and/or "selected" sign information. The expression "adapting" one or more vehicle functions may throughout refer to "adjusting" and/or "set" one or more vehicle functions, whereas "based on" detected sign information throughout may refer to "taking into account", "considering" and/or "using as input and/or input data" detected sign information. Moreover, "detected" sign information may throughout the disclosure refer to "recognized", "interpreted", "extracted" and/or "determined" sign information, and/or "detected sign information" may throughout simply refer to "sign information". The expression "captured by means of" may throughout refer to "captured with support from", whereas "captured" throughout may refer to "sensed", "observed", "recognized", "recorded", "derived, "detected" and/or "visually or optically captured". Said capturing may be accomplished as commonly known in the art with support from one or more image capturing devices such as one or more cameras arbitrarily arranged on-board the first vehicle, and further by utilizing e.g. commonly known image recognition and/or pattern recognition. The expression "sign information" presented on a road sign may throughout refer to "main and/or primary sign information" and/or "traffic information" presented on a road sign, whereas "information" presented may refer to "text, letters, numbers and/or symbols" presented. Moreover, the expression information "presented on" may throughout this disclosure refer to information "provided on", "featured on", "painted" on", "printed on" and/or "digitally displayed on". Furthermore, the expression of a road sign "detectable by said first vehicle" may throughout refer to a road sign "which the first vehicle is approaching", "in the vicinity of said first vehicle", "within detectable range of said first vehicle" and/or "within a detectable range of said first vehicle essentially in a heading direction thereof". Additionally or alternatively, "detectable" may in this context refer to "detected". Moreover, "capturing first detected sign information from at least a portion of sign information presented on a first road sign" may refer to "capturing first detected sign information of a first road sign".

Since the sign pertinence receiving system captures first detected sign information from a first road sign, content featured and/or provided on a first sign within detectable range of said first vehicle, is derived by the first vehicle. The expression "first" road sign may refer to "upcoming", "selected", "specific" and/or "detectable" road sign, and "first road sign" may further refer to "first road sign detectable by said first vehicle" and/or simply "road sign" and/or "road sign detectable by said first vehicle". In a similar manner, the expression "first detected sign information" may refer simply to "detected sign information". "First" may further refer to "at least a first". "Capturing" may refer to "sensing", "observing", "recognizing", "recording", "deriving, "detecting" and/or "visually or optically capturing". Moreover, "capturing" may refer to "capturing with support from said one or more image capturing devices on-board the first vehicle". Additionally or alternatively, "capturing first detected sign information from a first road sign" may refer to "capturing first detected sign information from at least a portion of sign information presented on a first road sign" and/or to "capturing said detected sign information".

Since the sign pertinence receiving system further receives a most likely supplementary information estimate indicating supplementary information deemed to pertain to the first road sign, which most likely supplementary information estimate is based on detected supplementary information captured by at least one second vehicle from supplementary sign information assigned to the first road sign, detected supplementary information related to the first road sign—captured by one or more other vehicles and subsequently evaluated for determination of the most likely supplementary information alternative—is received by the first vehicle. Thereby, the first vehicle is informed of detected supplementary information associated with the first road sign captured by other vehicles previously having passed by and captured supplementary sign information—and naturally optionally sign information—of the first road sign, for instance during favourable weather conditions. The position of the first road sign, and/or the position thereof in relation to the at least second vehicle—may for instance be known from and/or have been determined from digital map data and vehicle positioning as commonly known in the art. "Receiving" may refer to "deriving", "fetching" and/or "requesting". Additionally or alternatively, "receiving" may refer to "receiving, upon approaching said first road sign,". "Upon" may refer to "when", "if" and/or "provided that", whereas "approaching", may refer to "deemed to approach", "approaching and/or having reached", "heading toward", "being estimated to arrive at", "within a predetermined distance being estimated to arrive at" and/or "within a predetermined time being estimated to arrive at". Such a predetermined distance may for instance refer to 1000, 500 or 300 meters, whereas such a predetermined time for instance may refer to 15, 10 or 5 seconds. According to an example, "approaching", may further refer to "approaching and/or being in the vicinity of". Determination and/or estimation of that the first vehicle is approaching a road sign may be determined as commonly known in the art, for instance with support from and/or by means of the discussed above exemplifying system adapted or configured to communicate with one or more vehicles, the one or more servers and/or automotive clouds and/or the vehicle management system, and further for instance as commonly known by analysing the vehicle position derived from e.g. a positioning system on-board the first vehicle and/or a vehicle heading direction, potentially in combination with e.g. digital map data in a known manner. Additionally or alternatively, "receiving" may refer to "receiving from a sign pertinence evaluation system associated with a system supporting communication with one or more vehicles". The "system supporting communication with one or more vehicles" was discussed above, whereas the "sign pertinence evaluation system" will be discussed in further detail further on. The "sign pertinence evaluation system" may at least partly be comprised in, be connected to and/or relate to said system supporting communication with one or more vehicles, and/or at least partly be comprised in, be connected to and/or relate to the one or more servers and/or automotive clouds and/or vehicle management system discussed above. The most likely supplementary information estimate may accordingly be determined by said sign pertinence evaluating system remotely from the first vehicle, and then subsequently be provided to said first vehicle. The expression "most likely supplementary information estimate" may refer to "likely supplementary information estimate", and "estimate" may further refer to "candidate", "interpretation" and/or "alternative". The expression estimate "deemed" to pertain to the first road sign may refer to estimate "determined" and/or "evaluated" to pertain to the first road sign, whereas estimate deemed to "pertain to" the first road sign may refer to estimate deemed to "be valid for" and/or "be assigned to" the first road sign. Additionally or alternatively, "deemed to pertain" may refer to "deemed by the sign pertinence evaluating system to pertain". The "most likely supplementary information estimate" equals or essentially equals a detected supplementary information alternative captured by at least one of the at least one second vehicle, which alternative is deemed most likely to reflect the supplementary sign information. The more vehicles having captured identical detected supplementary information, the more likely may it be that that alternative is the correct or essentially correct estimation of the supplementary sign information. The most likely supplementary information estimate may thus indicate, reflect and/or represent one alternative out of potentially numerous different detected supplementary information alternatives respectively captured by different vehicles and/or at different occasions. The expression that the estimate "is based on" detected supplementary information may refer to that the estimate "is derived from", "is selected from" and/or "is selected from one of" detected supplementary information. Additionally or alternatively, the expression that the estimate "is based on" detected supplementary information may refer to that the estimate "is based on evaluation of" detected supplementary information and/or that the estimate "is based on evaluation of respective" detected supplementary information. "At least one second vehicle" may refer to "one or more other vehicles", "one or more capturing vehicles" and/or "at least one other vehicle". "Captured by at least one second vehicle" may refer to "captured by at least one second vehicle, with support from one or more image capturing devices on-board said second vehicle". Moreover, the expression supplementary sign information "assigned to" the first road sign may refer to supplementary sign information "presented in association with sign information presented on" the first road sign and/or supplementary sign information "related to and/or relevant for" the first road sign and/or "supplementary information presented in the vicinity of the first road sign". It should be noted that supplementary information may be presented on the first road sign itself or on one or more separate road signs associated with, or in the vicinity of the first road sign. Moreover, "assigned to said first road sign" may refer to "assigned to said first road sign and/or at least a portion of sign information thereon". "Supplementary sign information" may refer to one or more restrictions of a road sign and/or sign information to which said supplementary sign information is assigned, restrict the main sign information to specific situations, time periods or dates, and/or qualify the meaning of the main sign information, for instance indicating to what type of vehicle, during what time and/or during which weather conditions the road sign and/or sign information applies and/or pertains. The supplementary sign information may comprise any arbitrary combination of e.g. numbers, letters and/or symbols, and furthermore, "supplementary" may refer to "additional" and/or "validity".

Moreover, since a correctness confidence value associated with the most likely supplementary information estimate moreover exceeds a minimum correctness confidence threshold, it is provided that the most likely supplementary information estimate has been deemed—e.g. by the sign pertinence evaluating system which will be described in greater detail further on—to pertain to the first road sign, with a satisfying confidence level. That is, only a most likely supplementary information estimate that have been determined to have a confidence value higher than said minimum correctness confidence threshold, is provided to—and subsequently received by—the sign pertinence receiving system. Vice versa, a most likely supplementary information estimate that have been determined to have a correctness confidence value not reaching the minimum correctness confidence threshold, would not have been provided to—and subsequently not have been received by—the sign pertinence receiving system. Accordingly, it is ensured that only a most likely supplementary information estimate of high enough confidence is provided to the first vehicle. The more confident of that the most likely supplementary information estimate correctly reflects the supplementary sign information assigned to the first road sign, the higher may the correctness confidence value associated therewith, have been determined to be. The correctness confidence value may have been determined for instance based on how many identical detected supplementary information that have been provided from the one or more other vehicles previously having passed by the first road sign. Additionally or alternatively, the correctness confidence value may have been determined based on evaluation of respective detection confidence values associated with respective detected supplementary information captured by the respective other vehicles. The expression "correctness confidence value" may refer to "supplementary information estimate correctness confidence value", whereas "associated with" the most likely supplementary information estimate may refer to "corresponding to" and/or "of" the most likely supplementary information estimate. The correctness confidence value may for instance be represented by a number, for instance ranging between 1 and 10. Additionally or alternatively, "correctness confidence value" may refer to "correctness confidence value—determined by said sign pertinence evaluating system—". The expression "exceeds" a minimum correctness confidence threshold may refer to "is equal to and/or greater than" a minimum correctness confidence threshold, whereas "a minimum correctness confidence threshold" may refer to "a lowest allowed correctness confidence level". The minimum correctness confidence threshold may for instance be represented by an arbitrary number, such as for instance "7". Additionally or alternatively, "a minimum correctness confidence threshold" may refer to "a predetermined and/or pre-set minimum correctness confidence threshold" and/or "a minimum correctness confidence threshold set by said sign pertinence evaluating system".

Since the sign pertinence receiving system further determines whether the most likely supplementary estimate pertains to the first vehicle, it is established if said estimate—and subsequently the sign information and/or the road sign—is deemed to be valid for the first vehicle. "Whether" may refer to "if", and the expression that the estimate "pertains to" the first vehicle may in this context refer to that the estimate "is valid for", "is inclusive of", "includes", and/or "covers" the first vehicle. "Determining" may refer to "evaluating". Additionally or alternatively, "determining" may refer to "determining based on comparison of the most likely supplementary information estimate with:

characteristics of the first vehicle, one or more timing conditions, such as a current time, date and/or month, and/or one or more environmental conditions."

The characteristics and/or conditions above may for instance be digitally stored, and further e.g. be locally stored at the first vehicle. The characteristics and/or conditions may further be derivable with support from e.g. one or more sensors such as sensors providing one or more of a time indication, a slippery road indication, a fog indication, a snow indication, an indication of an outside temperature, etc. Additionally or alternatively, said characteristics and/or conditions may be derived from a remote arbitrary source, such as e.g. the vehicle management system discussed above. The expression "characteristics" of the first vehicle may for instance refer to type of vehicle, weight, length, width and/or model or the like of said vehicle, whereas "environmental conditions" may refer to for instance weather conditions such as fog, snow, rain and/or ice on the road, etc., and/or for instance a current traffic situation such as e.g. heavy traffic.

Since the sign pertinence receiving system refrains from said presenting extracted sign information and/or from said adapting one or more vehicle functions, provided that the most likely supplementary information estimate is determined to not pertain to the first vehicle, the first vehicle may discard the detected sign information of the first road sign should the most likely supplementary information estimate indicate that the sign information of the first road sign is irrelevant to the first vehicle. Accordingly, the first vehicle may ignore supplementary information of the first road sign potentially detected by said first vehicle, and/or it may not even be necessary for the first vehicle to—successfully or not—capture said supplementary information; a task which may be challenging e.g. during unfavourable weather conditions and/or should the one or more image capturing devices on-board the first vehicle for whatever reason such as e.g. smudge, dirt, and/or reflections on said devices, on the first road sign and/or on an optional separate supplementary sign, be unable to capture said supplementary sign information. Instead, the first vehicle may rely on supplementary information formerly captured by at least one other vehicle, which supplementary information subsequently—as represented by the most likely supplementary information estimate—has been deemed to pertain to the first road sign. Consequently, by taking into consideration the most likely supplementary information estimate rather than, and/or as a complement to, by the first vehicle captured supplementary sign information which potentially erroneously—e.g. during unfavourable conditions—may indicate that the sign information and/or road sign does pertain to the first vehicle when it in fact—and as may be indicated by the most likely supplementary information estimate—does not, there is less risk of the first vehicle erroneously presenting extracted sign information non-pertinent to said vehicle and/or less risk of erroneously adapting one or more vehicle functions based on sign information non-pertinent to said vehicle. That is, the first vehicle may to greater extent avoid presenting extracted sign information irrelevant to said vehicle, and/or to greater extent avoid adapting one or more vehicle functions based on sign information irrelevant to said vehicle. "Refraining from" may refer to "refraining said first vehicle from", "suppressing", "abstaining from", "discarding", "avoiding" and/or "ignoring", whereas "provided that" may refer to "if", "when", "in case" or "should". The expression "said presenting extracted information" may refer to "said presenting the extracted information", "presenting extracted sign information within said first vehicle based on the first detected sign information" and/or "presenting extracted sign information in view of the first road sign". In a similar manner, "said adapting one or more vehicle functions" may refer to "said adapting the one or more vehicle functions", "adapting one or more vehicle functions based on the first detected sign information" and/or "adapting one or more vehicle functions in view of the first road sign". Capturing detected supplementary sign information discussed above, may optionally comprise additionally capturing first detected supplementary information from at least a portion of supplementary sign information assigned to the first road sign. Refraining from said presenting extracted sign information and/or from said adapting one or more vehicle functions discussed above, then comprises refraining from said presenting extracted sign information and/or from said adapting one or more vehicle functions, provided that the most likely supplementary information estimate is determined to not pertain to the first vehicle and provided that a detection confidence value associated with the first detected supplementary information is below a minimum detection confidence threshold. Thereby, the first vehicle may discard the detected sign information should the most likely supplementary information estimate indicate that the sign information is irrelevant to the first vehicle and should a detection confidence value of supplementary information detected by the first vehicle be lower than a minimum detection confidence threshold. Accordingly, in this scenario, the first vehicle may ignore the first detected supplementary information captured by said first vehicle, in case a confidence value—determined in association with capturing the first detected supplementary information and indicating to what extent said capturing was deemed successful—does not reach up to a lowest allowed detection confidence level. To what extent said capturing was deemed to be successful may be determined as commonly known in the art, e.g. taking into account ability of detection. The expression "detection confidence value" may refer to "supplementary information detection confidence value", whereas "associated with" the first detected supplementary information may refer to "corresponding to" and/or "of" the first detected supplementary information. The detection confidence value may for instance be represented by a number, for instance ranging between 0-10. The expression "is below" a minimum detection confidence threshold may refer to "is equal to and/or lower than" a minimum detection confidence threshold, whereas "a minimum detection confidence threshold" may refer to "a lowest allowed detection confidence level". The minimum detection confidence threshold may for instance be represented by any arbitrary number, such as for instance "7". Additionally or alternatively, "a minimum detection confidence threshold" may refer to "a predetermined and/or pre-set minimum detection confidence threshold".

Optionally, the road sign and/or the first road sign may comprise a speed limit sign, the sign information may comprise a speed limit, the extracted sign information may indicate a speed limit, and/or said adapting one or more vehicle functions may comprise adapting a vehicle speed of the vehicle and/or the first vehicle. Thereby, the first vehicle may discard the detected speed limit of the first speed limit sign should the most likely supplementary information estimate indicate that the speed limit of the first speed limit sign is irrelevant to the first vehicle.

Furthermore, optionally, the supplementary sign information may comprise one or more validity restrictions of the sign information presented on the road sign and/or the first road sign. The expression "one or more validity restrictions" of the sign information may refer to "one or more conditions pertaining to one or more validity restrictions" of the sign information. Moreover, the expression validity restrictions "of" the sign information may refer to validity restrictions "associated with" and/or "pertaining to" the sign information. The supplementary information may for instance indicate that the sign information is valid only for vehicles having a weight exceeding a specified limit, such as for instance two tons. Additionally or alternatively, the supplementary information may indicate that the sign information is valid only during a specified time range, such as for instance from 5-17 o'clock and/or from Monday-Friday. Additionally or alternatively, the supplementary information may indicate that the sign information is valid only during specified weather conditions, such as during conditions of for instance snow, ice, hail, rain and/or fog. Additionally or alternatively, the supplementary information may indicate that the sign information is valid only for trucks, busses, campers, vehicles with trailers, and/or the like. Additionally or alternatively, the supplementary information may indicate that the sign information is valid only for tractors. Additionally or alternatively, the supplementary information may indicate that the sign information is valid only for motorcycles. Additionally or alternatively, the supplementary information may indicate that the sign information is valid only for vehicles other than cars, e.g. passenger cars.

Optionally, the supplementary sign information is presented on at least one sign separate from, but in direct proximity of, the road sign and/or the first road sign, i.e. on at least one sign located above, below, beside, in front of or behind the road sign and/or the first road sign. The supplementary road sign may for instance be placed directly beneath the road sign and/or the first road sign. The supplementary road sign may be of any arbitrary shape, size and/or colour combination, and have any arbitrary amount of supplementary information presented thereon.

According to a second embodiment herein, the object is achieved by a sign pertinence receiving system on-board adapted or configured for on-board a first vehicle enabling the first vehicle to discard non-pertinent road sign information. The first vehicle is adapted or configured for presenting extracted sign information within the first vehicle and/or adapting one or more vehicle functions based on detected sign information captured by means of one or more image capturing devices on-board the first vehicle from at least a portion of sign information presented on a road sign detectable by the first vehicle. The sign pertinence receiving system comprises a sign information capturing unit adapted or configured for capturing first detected sign information from a first road sign. The sign pertinence receiving system further comprises an estimate receiving unit adapted or configured for receiving a most likely supplementary information estimate indicating supplementary information deemed to pertain to the first road sign which most likely supplementary information estimate is based on detected supplementary information captured by at least one second vehicle from supplementary sign information assigned to the first road sign, wherein a correctness confidence value associated with the most likely supplementary information estimate exceeds a minimum correctness confidence threshold. The sign pertinence receiving system further comprises a pertinence determining unit adapted or configured for determining whether the most likely supplementary information estimate pertains to the first vehicle. Moreover, the sign pertinence receiving system comprises a refraining unit adapted or configured for refraining from said presenting extracted sign information and/or from said adapting one or more vehicle functions, provided that the most likely supplementary information estimate is determined to not pertain to the first vehicle. Optionally, the sign information capturing unit may further be adapted or configured for additionally capturing first detected supplementary information from at least a portion of supplementary sign information assigned to the first road sign. The refraining unit is then adapted or configured for refraining from said presenting extracted sign information and/or from said adapting one or more vehicle functions, provided that the most likely supplementary information estimate is determined to not pertain to the first vehicle and provided that a detection confidence value associated with the first detected supplementary information is below a minimum detection confidence threshold. Furthermore, optionally, the road sign and/or the first road sign may comprise a speed limit sign. Additionally or alternatively, the sign information may optionally comprise a speed limit. Additionally or alternatively, the extracted sign information may optionally indicate a speed limit. Additionally or alternatively, said adapting one or more vehicle functions may optionally comprise adapting a vehicle speed of the vehicle and/or the first vehicle. Moreover, optionally, the supplementary sign information may comprise one or more validity restrictions of the sign information presented on the road sign and/or the first road sign. The supplementary sign information may for instance indicate that the sign information is valid only for vehicles having a weight exceeding a specified limit, during a specified time range, during specified weather conditions, for trucks, busses, campers, vehicles with trailers, and/or the like, for tractors, for motorcycles, and/or for vehicles other than cars. Optionally, the supplementary sign information may be presented on a sign separate from, but in direct proximity of, the road sign and/or the first road sign. Similar advantages as those mentioned in the foregoing in relation to the first embodiment correspondingly apply to the second, which is why these advantages are not further discussed.

According to a third embodiment herein, the object is achieved by a vehicle comprising at least a portion—such as the sign information capturing unit, the estimate receiving unit, the pertinence determining unit and/or the refraining unit—of the sign pertinence receiving system discussed above. The vehicle is adapted or configured for presenting extracted sign information within the vehicle and/or adapting one or more vehicle functions based on detected sign information captured by means of one or more image capturing devices on-board the vehicle from at least a portion of sign information presented on a road sign detectable by the vehicle. Again, similar advantages as those mentioned in the foregoing in relation to the first embodiment correspondingly apply to the third, which is why these advantages are not further discussed.

According to a fourth embodiment herein, the object is achieved by a method performed by a sign pertinence evaluating system for enabling at least a first vehicle to discard non-pertinent road sign information. The sign pertinence evaluating system is associated with a system supporting communication with one or more vehicles. The sign pertinence evaluating system receives from at least one second vehicle, detected supplementary information captured from supplementary sign information assigned to a first road sign. The sign pertinence evaluating system further determines based on evaluation of the received detected supplementary information, a most likely supplementary information estimate deemed to pertain to the first road sign, and a correctness confidence value associated therewith. Moreover, the sign pertinence evaluating system provides the most likely supplementary information estimate to the at least first vehicle determined to be approaching the first road sign, provided that the correctness confidence value exceeds a minimum correctness confidence threshold. The expression "for enabling at least a first vehicle to discard non-pertinent road sign information" may in this context refer to "for handling of road sign information pertinence", "for enabling at least a first vehicle to consider road sign information pertinence", and/or "for enabling selective handling of road sign information". Yet again, similar advantages as those mentioned in the foregoing in relation to the first embodiment correspondingly apply to the fourth, which is why these advantages are not further discussed.

According to a fifth embodiment herein, the object is achieved by a sign pertinence evaluating system adapted or configured for enabling at least a first vehicle to discard non-pertinent road sign information. The sign pertinence evaluating system is associated with a system supporting communication with one or more vehicles. The sign pertinence evaluating system comprises a supplementary information receiving unit adapted or configured for receiving from at least one second vehicle, detected supplementary information captured from supplementary sign information assigned to a first road sign. The sign pertinence evaluating system further comprises an estimate determining unit adapted or configured for determining based on evaluation of the received detected supplementary information, a most likely supplementary information estimate deemed to pertain to the first road sign, and a correctness confidence value associated therewith. Moreover, the sign pertinence evaluating system comprises an estimate providing unit adapted or configured for providing the most likely supplementary information estimate to the at least first vehicle determined to be approaching the first road sign, provided that the correctness confidence value exceeds a minimum correctness confidence threshold. Once more, similar advantages as those mentioned in the foregoing in relation to the first embodiment correspondingly apply to the fifth, which is why these advantages are not further discussed.

According to a sixth embodiment herein, the object is achieved by one or more servers and/or automotive clouds comprising at least a portion—such as the supplementary information receiving unit, the estimate determining unit and/or the estimate providing unit—of the sign pertinence evaluating system discussed above. Again, similar advantages as those mentioned in the foregoing in relation to the first embodiment correspondingly apply to the sixth, which is why these advantages are not further discussed.

According to a seventh embodiment herein, the object is achieved by a computer program product comprising a computer program containing computer program code means arranged to cause a computer or a processor to execute the steps of the sign pertinence receiving system discussed above and/or the sign pertinence evaluating system discussed above, stored on a computer-readable medium or a carrier wave. Yet again, similar advantages as those mentioned in the foregoing in relation to the first embodiment correspondingly apply to the seventh, which is why these advantages are not further discussed.

According to an eight embodiment herein, the object is achieved by:

A method performed by a sign pertinence managing system for enabling at least a first vehicle to discard non-pertinent road sign information, said sign pertinence management system comprising a sign pertinence receiving system adapted or configured to be on-board said first vehicle, and a sign pertinence evaluating system, said sign pertinence evaluating system being associated with a system supporting communication with one or more vehicles, said first vehicle being adapted or configured for presenting extracted sign information within said first vehicle and/or adapting one or more vehicle functions based on detected sign information captured by means of one or more image capturing devices on-board said first vehicle from at least a portion of sign information presented on a road sign detectable by said first vehicle, the method comprising said pertinence evaluating system performing the following actions:

receiving from at least one second vehicle, detected supplementary information captured from supplementary sign information assigned to a first road sign;

determining based on evaluation of said received detected supplementary information, a most likely supplementary information estimate deemed to pertain to said first road sign, and a correctness confidence value associated therewith; and providing said most likely supplementary information estimate to said at least first vehicle determined to be approaching said first road sign, provided that said correctness confidence value exceeds a minimum confidence threshold;

the method further comprising said pertinence receiving system performing the following actions:

capturing first detected sign information from said first road sign;

receiving said most likely supplementary information estimate;

determining whether said most likely supplementary information estimate pertains to said first vehicle; and refraining from said presenting extracted sign information and/or from said adapting one or more vehicle functions, provided that said most likely supplementary information estimate is determined to not pertain to said first vehicle.

Once more, similar advantages as those mentioned in the foregoing in relation to the first embodiment correspondingly apply to the eight, which is why these advantages are not further discussed.

According to a ninth embodiment herein, the object is achieved by:

A sign pertinence managing system adapted or configured for enabling at least a first vehicle to discard non-pertinent road sign information, said sign pertinence management system comprising a sign pertinence receiving system adapted or configured to be on-board said first vehicle, and a sign pertinence evaluating system, said sign pertinence evaluating system being associated with a system supporting communication with one or more vehicles, said first vehicle being adapted or configured for presenting extracted sign information within said first vehicle and/or adapting one or more vehicle functions based on detected sign information captured by means of one or more image capturing devices on-board said first vehicle from at least a portion of sign information presented on a road sign detectable by said first vehicle, said pertinence evaluating system comprising:

a supplementary information receiving unit adapted or configured for receiving from at least one second vehicle, detected supplementary information captured from supplementary sign information assigned to a first road sign;

an estimate determining unit adapted or configured for determining based on evaluation of said received detected supplementary information, a most likely supplementary information estimate deemed to pertain to said first road sign, and a correctness confidence value associated therewith; and an estimate providing unit adapted or configured for providing said most likely supplementary information estimate to said at least first vehicle determined to be approaching said first road sign, provided that said correctness confidence value exceeds a minimum confidence threshold;

said pertinence receiving system comprising:

a sign information capturing unit adapted or configured for capturing first detected sign information from said first road sign;

an estimate receiving unit adapted or configured for receiving said most likely supplementary information estimate;

a pertinence determining unit adapted or configured for determining whether said most likely supplementary information estimate pertains to said first vehicle; and a refraining unit adapted or configured for refraining from said presenting extracted sign information and/or from said adapting one or more vehicle functions, provided that said most likely supplementary information estimate is determined to not pertain to said first vehicle.

Again, similar advantages as those mentioned in the foregoing in relation to the first embodiment correspondingly apply to the ninth, which is why these advantages are not further discussed.

BRIEF DESCRIPTION OF THE DRAWINGS

The various non-limiting embodiments of the disclosure, including particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory. In the following, according to embodiments herein which relate to enabling a first vehicle to discard non-pertinent road sign information, there will be disclosed an approach according to which road sign information considered irrelevant to said vehicle, is ignored.

Figure 1:
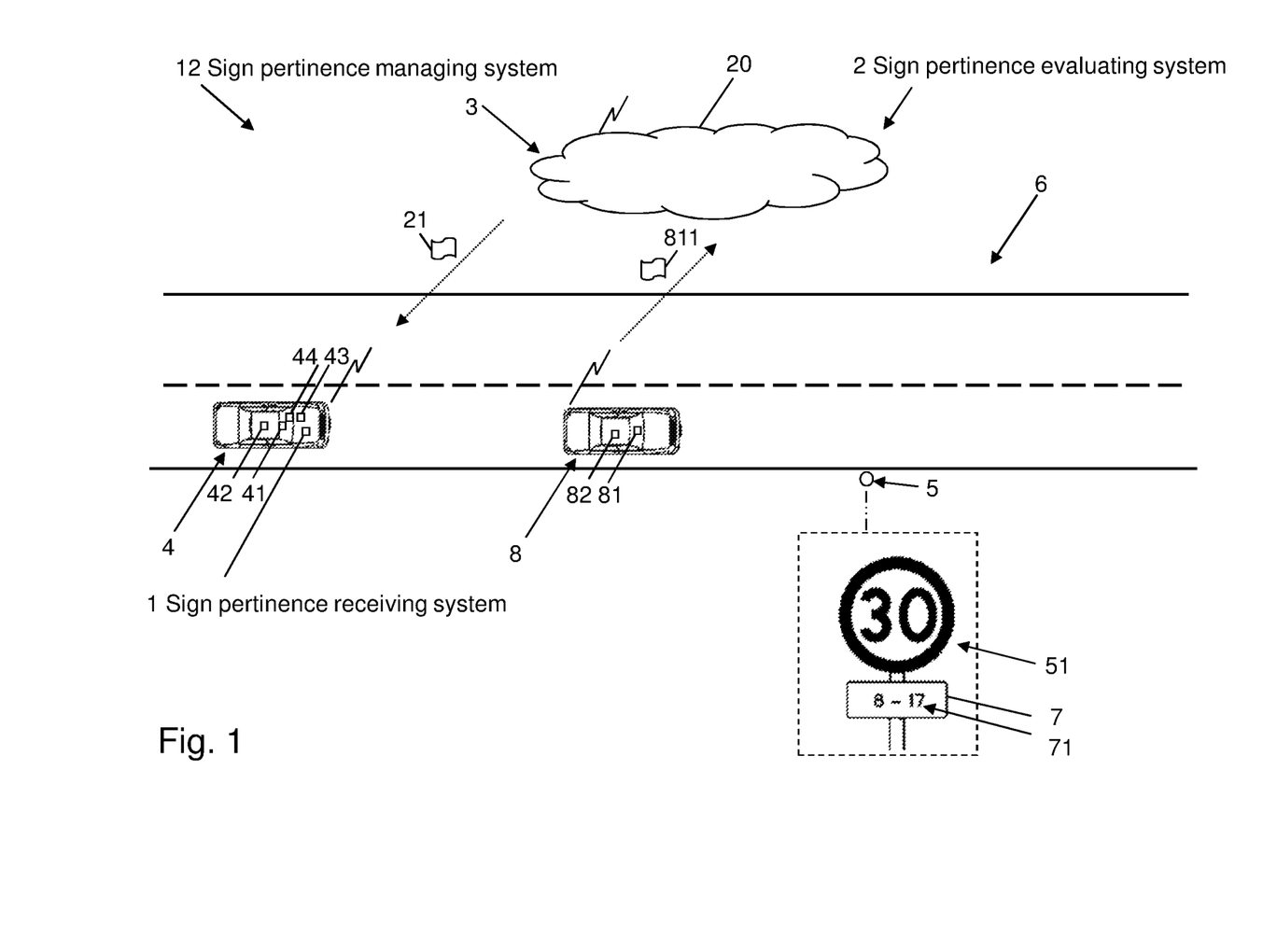
FIG. 1 illustrates a schematic overview of an exemplifying sign pertinence receiving system and an exemplifying sign pertinence evaluating system according to embodiments of the disclosure.

Referring now to the figures and FIG. 1 in particular, there is illustrated a schematic overview of an exemplifying sign pertinence receiving system 1 and an exemplifying sign pertinence evaluating system 2 according to embodiments of the disclosure. The sign pertinence receiving system 1 and the sign pertinence evaluating system 2 combined may constitute a sign pertinence managing system 12. The sign pertinence evaluating system 2 is associated with a system 3 supporting communication with one or more vehicles, and is further at least partly comprised in one or more servers and/or automotive clouds 20. The sign pertinence receiving system 1 is at least partly comprised in a vehicle, here represented by a first vehicle 4. The first vehicle 4 may comprise and/or have on-board one or more commonly known image capturing devices 41 such as cameras, optionally comprise and/or have on-board a known positioning system 42 to support vehicle positioning, optionally comprise and/or have on-board one or more known presenting devices 43 such as e.g. a digital display integrated with the instrument panel, and furthermore optionally comprise a commonly known speed limit adaption system 44. The first vehicle 4 is adapted or configured for presenting extracted sign information within the first vehicle 4—for instance with support from the one or more presenting devices 43—and/or adapting one or more vehicle functions—for instance with support from the speed limit adaptation system 44—based on detected sign information captured by means of the one or more image capturing devices 41 on-board the first vehicle 4 from at least a portion of sign information 51—here represented by first sign information 51—presented on a road sign 5—here represented by a first road sign 5—detectable by the first vehicle 4. The first road sign 5 of the exemplifying embodiment of FIG. 1, which the first vehicle 4 is approaching, is positioned in an exemplifying manner along a road 6 along which the first vehicle 4 is driving. The first road sign 5 may comprise a speed limit sign, and moreover, the sign information 51 may comprise a speed limit, here represented by exemplifying 30 km/h. Here, the sign information is correctly captured by the first vehicle 4 and the detected sign information is thus represented by 30 km/h. Correspondingly, the extracted sign information may thus indicate a speed limit, here 30 km/h, and/or the first vehicle 4 may thus be adapted or configured for adapting a vehicle speed of the first vehicle 4 based on the detected sign information 51, here to 30 km/h.

Assigned to the sign information 51 is supplementary sign information 71, here presented on a sign 7 separate from, but in direct proximity of, the first road sign 5. The sign information 71 may comprise one or more validity restrictions of the sign information 51 presented on the first road sign 5. The supplementary sign information 51 may for instance indicate that the sign information 51 is valid only for vehicles having a weight exceeding a specified limit, during a specified time range, during specified weather conditions, for trucks, busses, campers, vehicles with trailers and/or the like, for tractors, for motorcycles and/or for vehicles other than cars. In the shown embodiment of FIG. 1, the supplementary sign information 51 is represented by a specified time range "8-17", during which time range the sign information 51 pertains, and outside of which time range the sign information 51 does not pertain. In the exemplifying embodiment, the first vehicle 4 is not able to correctly capture the supplementary information 71, for instance due to unfavorable weather conditions such as fog or snow, and/or sunlight reflections. Thus, detected supplementary information—here represented by first detected supplementary information—captured by the first vehicle 4 from at least a portion of supplementary sign information 71 assigned to the first road sign 5, is here interpreted to be represented by the time range "0-11" with a detection confidence value associated therewith determined to be "4" on a scale from 0-10. It may be noted that in the exemplifying embodiment, a current time of day is exemplifying 07:00 (7 a.m.)

Shown in FIG. 1 is further an exemplifying at least one second vehicle 8, which at least one second vehicle 8 may comprise and/or have on-board one or more image capturing devices 81 such as cameras. The second vehicle 8 is adapted or configured for providing detected supplementary information 811 captured from the supplementary sign information 71 assigned to the first road sign 5, to the sign pertinence evaluating system 2, for instance via the system 3 supporting communication with one or more vehicles. Here, the detected supplementary information 811 is correctly captured by the second vehicle 8 and is thus represented by the specified time range "8-17". The second vehicle 8 may further optionally comprise and/or have on-board a positioning system 82 to support vehicle positioning.

Further shown in FIG. 1 is a most likely supplementary information estimate 21, received by the sign pertinence receiving system 1 from the sign pertinence evaluating system 2. The most likely supplementary information estimate 21 will be described in greater detail in conjunction with FIGS. 3 and 5.

Figure 2:
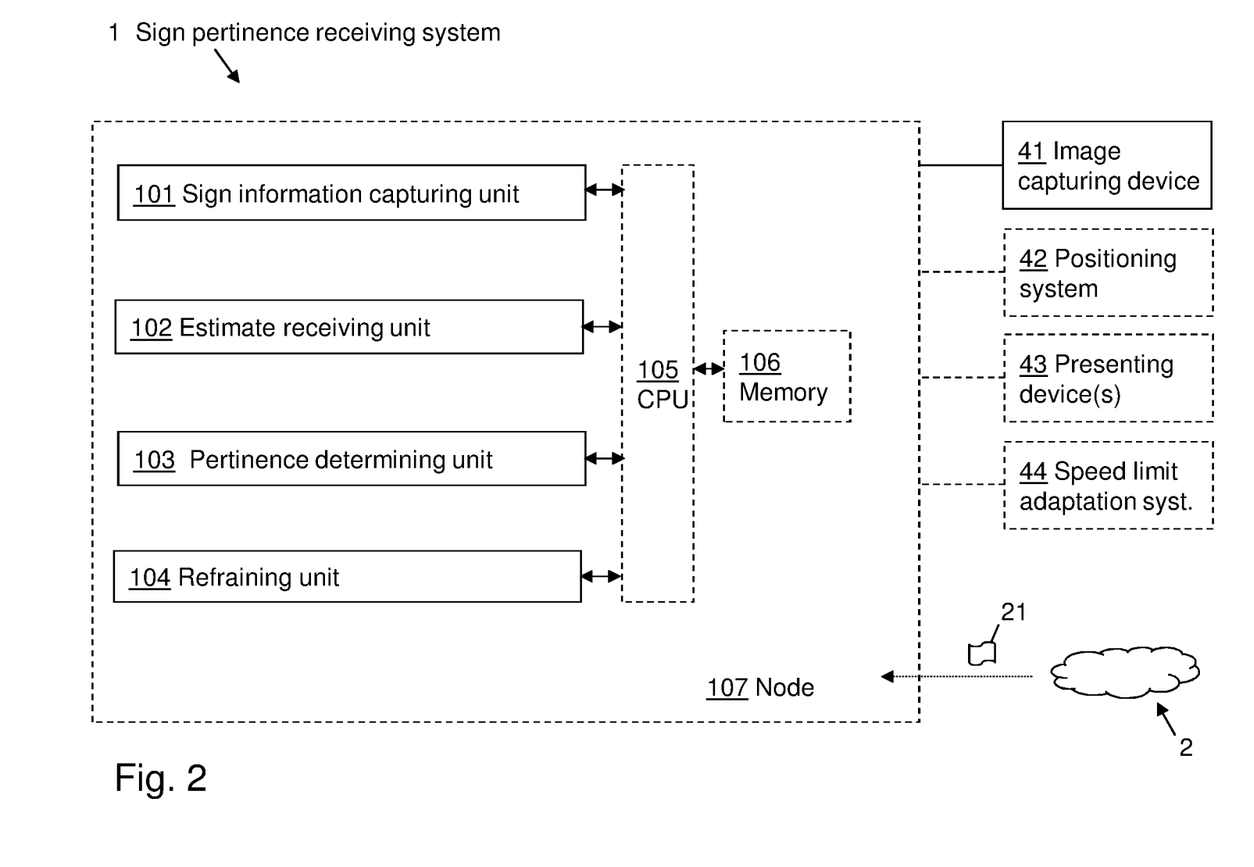
FIG. 2 is a schematic block diagram illustrating an exemplifying sign pertinence receiving system according to embodiments of the disclosure.
Figure 3:
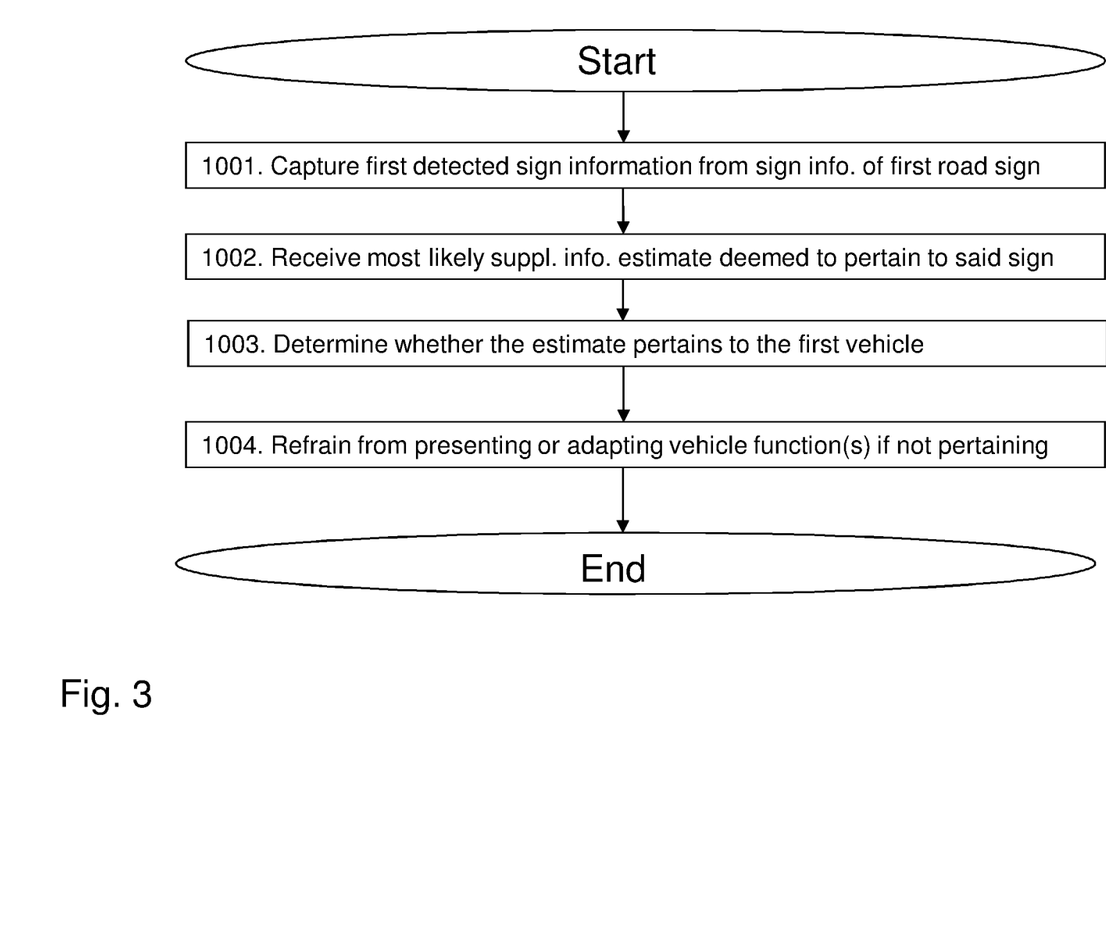
FIG. 3 is a flowchart depicting an exemplifying method—performed by a sign pertinence receiving system on-board a first vehicle—for enabling the first vehicle to discard non-pertinent road sign information, according to embodiments of the disclosure.

As further shown in FIG. 2, which depicts a schematic block diagram illustrating an exemplifying sign pertinence receiving system 1 according to embodiments of the disclosure, the sign pertinence receiving system 1 comprises a sign information capturing unit 101, an estimate receiving unit 102, a pertinence determining unit 103 and a refraining unit 104, all of which be described in greater detail in conjunction with FIG. 3. Furthermore, the embodiments herein—relating to the sign pertinence receiving system 1—for on-board a first vehicle 4 enabling the first vehicle 4 to discard non-pertinent road sign information 51, may be implemented through one or more processors, such as a processor 105, here denoted CPU, together with computer program code for performing the functions and actions of the embodiments herein. Said program code may also be provided as a computer program product, for instance in the form of a data carrier carrying computer program code for performing the embodiments herein when being loaded into the sign pertinence receiving system 1. One such carrier may be in the form of a CD ROM disc. It is however feasible with other data carriers such as a memory stick. The computer program code may furthermore be provided as pure program code on a server and downloaded to the sign pertinence receiving system 1. The sign pertinence receiving system 1 may further comprise a memory 106 comprising one or more memory units. The memory 106 may be arranged to be used to store e.g. information, and further to store data, configurations, schedulings, and applications, to perform the methods herein when being executed in the sign pertinence receiving system 1. Furthermore, the sign information capturing unit 101, the estimate receiving unit 102, the pertinence determining unit 103, the refraining unit 104, the optional processor 105 and/or the optional memory 106 may at least partly be comprised in the first vehicle 4, for instance in one or more nodes 107 thereof such as electronic control units (ECUs), and/or at least partly comprised in a mobile device which may be carried on-board the first vehicle 4 and which may be integrated with and/or able to communicate with said first vehicle 4. Those skilled in the art will also appreciate that the sign information capturing unit 101, the estimate receiving unit 102, the pertinence determining unit 103 and/or the refraining unit 104 described above, and which will be described in more detail later on in this description, may refer to a combination of analog and digital circuits, and/or one or more processors configured with software and/or firmware, e.g. stored in a memory such as the memory 106, that when executed by the one or more processors such as the processor 105 perform as will be described in more detail in conjunction with FIG. 3. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

FIG. 3 is a flowchart depicting an exemplifying method—performed by a sign pertinence receiving system 1 on-board a first vehicle 4—for enabling the first vehicle 4 to discard non-pertinent road sign information 51, according to embodiments of the disclosure. The first vehicle 4 is, as explained above in conjunction with FIG. 1, adapted or configured for presenting extracted sign information within the first vehicle 4 and/or adapting one or more vehicle functions based on detected sign information captured by means of one or more image capturing devices 41 on-board the first vehicle 4 from at least a portion of sign information 51 presented on a road sign 5 detectable by the first vehicle 4. Thus, as shown with support from FIGS. 1 and 2, the first vehicle 4 is configured to take action in consideration of the detected sign information. The exemplifying method, which may be continuously repeated, comprises the following actions discussed with support essentially from FIGS. 1-2. The actions may be taken in any suitable order, for instance may Action 1001 and Actions 1002-1003 be performed simultaneously and/or in an alternate order.

Action 1001

In Action 1001, the sign pertinence receiving system 1 captures first detected sign information from a first road sign 5. Correspondingly, the sign information capturing unit 101 is adapted or configured for capturing first detected sign information from a first road sign 5. Thus, as shown with support at least from FIGS. 1 and 2, content 51 featured and/or provided on the first sign 5 within detectable range of the first vehicle 4, is derived by the first vehicle 4, with support from the one or more image capturing devices 41.

Optionally, said Action 1001 of capturing may comprise additionally capturing first detected supplementary information from at least a portion of supplementary sign information 71 assigned to the first road sign 5. Correspondingly, the sign information capturing unit 101 may be adapted or configured for capturing first detected supplementary information from at least a portion of supplementary sign information 71 assigned to the first road sign 5. The first detected supplementary information may be captured with support from the one or more image capturing devices 41. The captured first detected supplementary information of the embodiment shown in FIG. 1 is, as discussed above, represented by the incorrectly interpreted time range "0-11".

Action 1002

In Action 1002, the sign pertinence receiving system 1 receives a most likely supplementary information estimate 21 indicating supplementary information deemed to pertain to the first road sign 5. Correspondingly, the estimate receiving unit 102 is adapted or configured for receiving a most likely supplementary information estimate 21 indicating supplementary information deemed to pertain to the first road sign 5. The most likely supplementary information estimate 21 is based on detected supplementary information 811 captured by at least one second vehicle 8 from supplementary sign information 71 assigned to the first road sign 5, wherein a correctness confidence value associated with the most likely supplementary information estimate 21 exceeds a minimum correctness confidence threshold. Thus, as shown with support at least from FIGS. 1 and 2, detected supplementary information 811 related to the first road sign 5—captured by one or more other vehicles 8 and subsequently evaluated for determination of the most likely supplementary information alternative 811—is received by the first vehicle 4. Thereby, the first vehicle 4 is informed of supplementary information associated with the first road sign 5 captured by other vehicles 8 previously having passed by and captured supplementary sign information of the first road sign 5, for instance during favourable weather conditions. Furthermore, thus, since a correctness confidence value associated with the most likely supplementary information estimate 21 moreover exceeds a minimum correctness confidence threshold, it is provided that the most likely supplementary information estimate 21 has been deemed—e.g. by the sign pertinence evaluating system 2 as will be described in greater detail in conjunction with FIGS. 4 and 5—to pertain to the first road sign 5, with a satisfying confidence level. That is, only a most likely supplementary information estimate 21 that have been determined to have a confidence value higher than said minimum correctness confidence threshold, is provided to—and subsequently received by—the sign pertinence receiving system 1.

Action 1003

In Action 1003, the sign pertinence receiving system 1 determines whether the most likely supplementary information estimate 21 pertains to the first vehicle 4. Correspondingly, the pertinence determining unit 103 is adapted or configured for determining whether the most likely supplementary information estimate 21 pertains to the first vehicle 4. Said determining may for instance comprise determining based on comparison of the most likely supplementary information estimate 21 with characteristics of the first vehicle 4, one or more timing conditions such as a current time, date and/or month, and/or one or more environmental conditions. Thus, it is established whether or not the estimate 21—and subsequently the sign information 51 and/or the road sign 5—is deemed to be valid for the first vehicle 4. In the shown embodiment of FIG. 1, the estimate 21 is determined not to pertain to the first vehicle 4, in that the most likely supplementary information estimate 21 indicates the specified time range "8-17" which excludes the exemplifying current time "07:00".

Action 1004

In Action 1004, the sign pertinence receiving system 1 refrains from said presenting extracted sign information and/or from said adapting one or more vehicle functions, provided that the most likely supplementary information estimate 21 is determined to not pertain to the first vehicle 4. Correspondingly, the refraining unit 104 is adapted or configured for refraining from said presenting extracted sign information and/or from said adapting one or more vehicle functions, provided that the most likely supplementary information estimate 21 is determined to not pertain to the first vehicle 4. Thus, as shown with support at least from FIGS. 1 and 2, the first vehicle 4 may discard the exemplifying detected sign information—here 30 km/h—of the first road sign 5 should the most likely supplementary information estimate 21—here the specified time range "8-17"-indicate that the sign information 51 of the first road sign 5 is irrelevant to the first vehicle 4—here not including the current time of day "07:00". Accordingly, it may not even be necessary for the first vehicle 4 to itself—successfully or not—capture the supplementary information 71—a task which may be challenging e.g. during unfavourable weather conditions and/or should the one or more image capturing devices 42 on-board the first vehicle 4 be unable to capture said supplementary sign information 71. Instead, the first vehicle 4 may rely on supplementary information 21 formerly captured by at least one other vehicle 8, which supplementary information 21 subsequently—as represented by the most likely supplementary information estimate 21—has been deemed to pertain to the first road sign 5. Consequently, by taking into consideration the most likely supplementary information estimate 21—here the specified time range "8-17", there is less risk of the first vehicle 4 erroneously presenting extracted sign information—here 30 km/h—non-pertinent to said vehicle 4 and/or less risk of erroneously adapting one or more vehicle functions—here a speed limit adaption system 44—based on sign information non-pertinent to said vehicle 4, which sign information here is non-pertinent due to a current time "07:00" not being included in the specified time range "8-17".

Optionally, should Action 1001 of capturing, comprise additionally capturing first detected supplementary information from at least a portion of supplementary sign information 71 assigned to the first road sign 5, then the Action 1004 of refraining may comprise refraining from said presenting extracted sign information and/or from said adapting one or more vehicle functions, provided that the most likely supplementary information estimate 21 is determined to not pertain to the first vehicle and provided that a detection confidence value associated with the first detected supplementary information is below a minimum detection confidence threshold. Thus, the first vehicle 4 may discard the detected sign information—here 30 km/h—should the most likely supplementary information estimate 21—here the specified time range "8-17"—indicate that the sign information 51 is irrelevant to the first vehicle 4 and should a detection confidence value of supplementary information detected by the first vehicle 4 be lower than a minimum detection confidence threshold. Accordingly, in the exemplifying embodiment of FIG. 1, the first vehicle 4 ignores the detected supplementary information captured by said first vehicle 4—here the time range "0-11"—as the confidence value—here "4"—determined in association with capturing the detected supplementary information and indicating to what extent said capturing was deemed successful, does not reach up to the lowest allowed detection confidence level here set to exemplifying "7".

Figure 4:
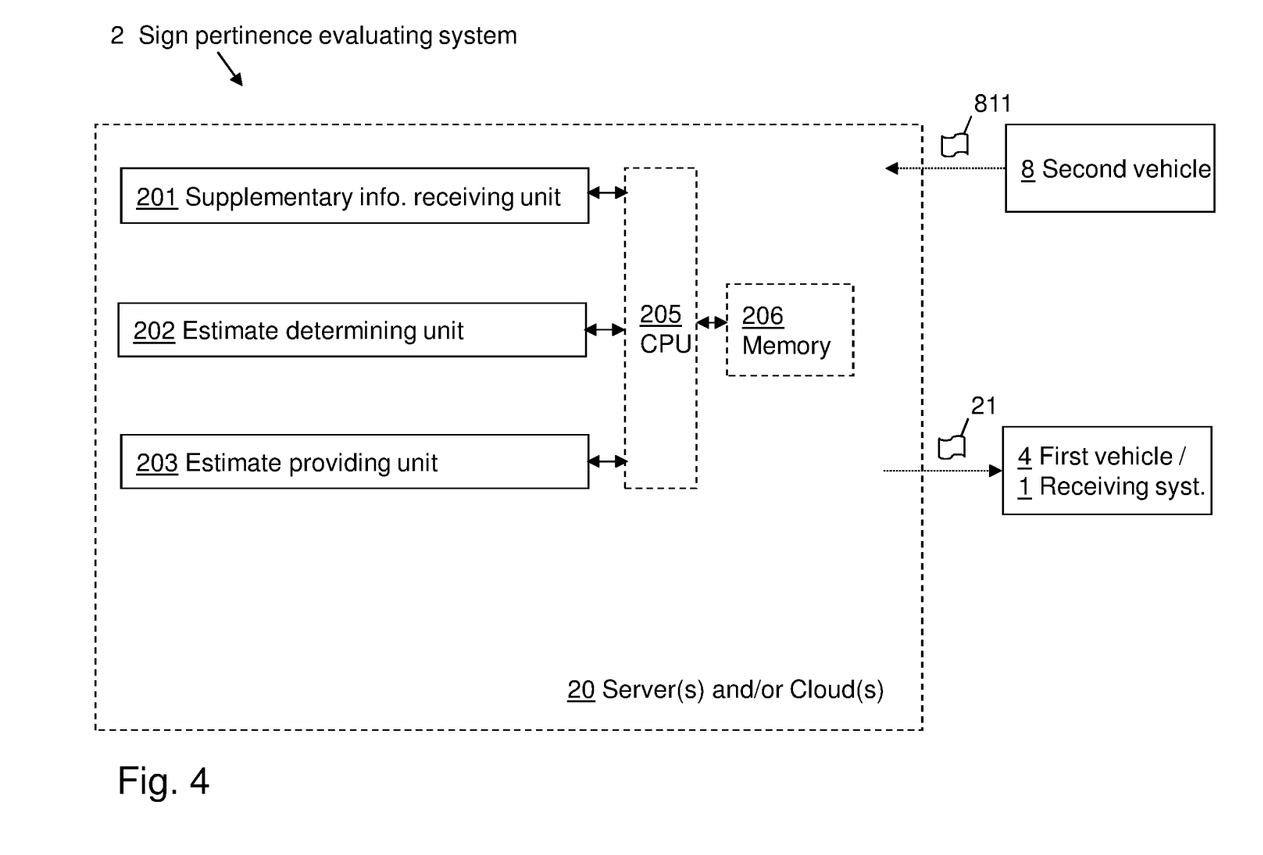
FIG. 4 is a schematic block diagram illustrating an exemplifying sign pertinence evaluating system according to embodiments of the disclosure.
Figure 5:
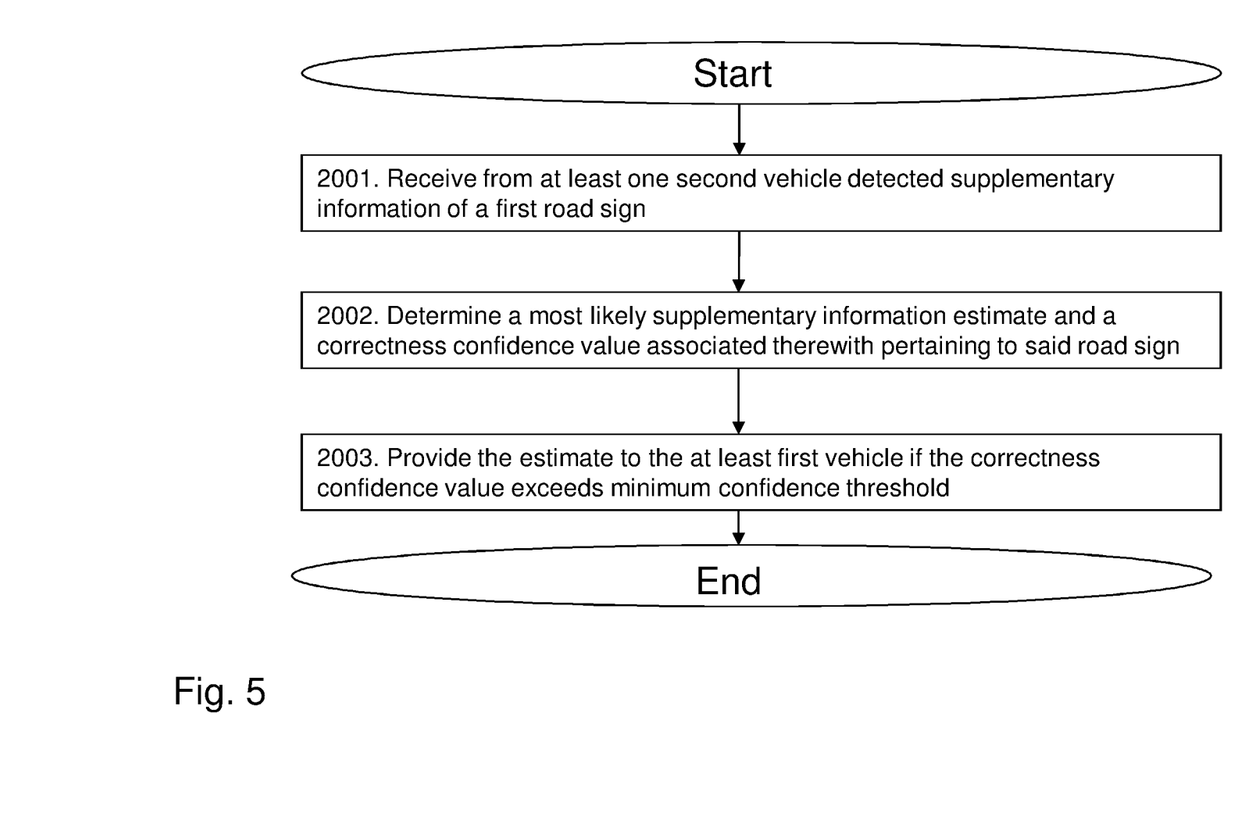
FIG. 5 is a flowchart depicting an exemplifying method—performed by a sign pertinence evaluating system—for enabling at least a first vehicle to discard non-pertinent road sign information, according to embodiments of the disclosure.

As further shown in FIG. 4, which depicts a schematic block diagram illustrating an exemplifying sign pertinence evaluating system 2 according to embodiments of the disclosure, the sign pertinence evaluating system 2 comprises a supplementary information receiving unit 201, an estimate determining unit 202 and an estimate providing unit 203, all of which be described in greater detail in conjunction with FIG. 5. Furthermore, the embodiments herein—relating to the sign pertinence evaluating system 2—for enabling the first vehicle 4 to discard non-pertinent road sign information 51, may be implemented through one or more processors, such as a processor 205, here denoted CPU, together with computer program code for performing the functions and actions of the embodiments herein. Said program code may also be provided as a computer program product, for instance in the form of a data carrier carrying computer program code for performing the embodiments herein when being loaded into the sign pertinence evaluating system 2. One such carrier may be in the form of a CD ROM disc. It is however feasible with other data carriers such as a memory stick. The computer program code may furthermore be provided as pure program code on a server and downloaded to the sign pertinence evaluating system 2. The sign pertinence evaluating system 2 may further comprise a memory 206 comprising one or more memory units. The memory 206 may be arranged to be used to store e.g. information, and further to store data, configurations, schedulings, and applications, to perform the methods herein when being executed in the sign pertinence evaluating system 2. Furthermore, the supplementary information receiving unit 201, the estimate determining unit 202, the providing unit 203, the optional processor 205 and/or the optional memory 206 may at least partly be comprised in the one or more servers and or clouds 20, the system 3 supporting communication with one or more vehicles and/or a vehicle management system such as e.g. Volvo On Call. Those skilled in the art will also appreciate that the supplementary information receiving unit 201, the estimate determining unit 202 and/or the providing unit 203 described above, and which will be described in more detail later on in this description, may refer to a combination of analog and digital circuits, and/or one or more processors configured with software and/or firmware, e.g. stored in a memory such as the memory 206, that when executed by the one or more processors such as the processor 205 perform as will be described in more detail in conjunction with FIG. 5. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

FIG. 5 is a flowchart depicting an exemplifying method—performed by a sign pertinence evaluating system 2—for enabling at least a first vehicle 4 to discard non-pertinent road sign information 51, according to embodiments of the disclosure. The sign pertinence evaluating system 2 is, as explained above in conjunction with FIG. 1, associated with a system 3 supporting communication with one or more vehicles. The exemplifying method, which may be continuously repeated, comprises the following actions discussed with support from FIGS. 1-4.

Action 2001

In Action 2001, the sign pertinence evaluating system 2 receives from at least one second vehicle 8, detected supplementary information 811 captured from supplementary sign information 71 assigned to a first road sign 5. Correspondingly, the supplementary information receiving unit 201 is adapted or configured for receiving from at least one second vehicle 8, detected supplementary information 811 captured from supplementary sign information 71 assigned to a first road sign 5.

Action 2002

In Action 2002, the sign pertinence evaluating system 2 determines based on evaluation of the received detected supplementary information 811, a most likely supplementary information estimate 21 deemed to pertain to the first road sign 5, and a correctness confidence value associated therewith. Correspondingly, the estimate determining unit 202 is adapted or configured for determining based on evaluation of the received detected supplementary information 811, a most likely supplementary information estimate 21 deemed to pertain to the first road sign 5, and a correctness confidence value associated therewith.

Action 2003

In Action 2003, the sign pertinence evaluating system 2 provides the most likely supplementary information estimate 21 to the at least first vehicle 4 determined to be approaching the first road sign 5, provided that the correctness confidence value exceeds a minimum correctness confidence threshold. Correspondingly, the estimate providing unit 203 is adapted or configured for providing the most likely supplementary information estimate 21 to the at least first vehicle 4 determined to be approaching the first road sign 5, provided that the correctness confidence value exceeds a minimum correctness confidence threshold.

It may be noted that the sign pertinence managing system 12 may perform the Actions 1001-1004 of the sign pertinence receiving system 1 and the Actions 2001-2003 of the sign pertinence evaluating system 2 discussed above, intertwined. Said Actions may be taken in any suitable order, for instance 2001→2002→2003→1001→1002→1003→1004.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method performed by a sign pertinence receiving system on-board a first vehicle for enabling the first vehicle to discard non-pertinent road sign information, the first vehicle being configured to present extracted sign information within the first vehicle and/or adapt one or more vehicle functions based on detected sign information captured by one or more image capturing devices on-board the first vehicle from at least a portion of sign information presented on a road sign detectable by the first vehicle, the method comprising:

capturing first detected sign information from a first road sign;

receiving a most likely supplementary information estimate indicating supplementary information deemed to pertain to the first road sign, which most likely supplementary information estimate is based on detected supplementary information captured by at least one second vehicle from supplementary sign information assigned to the first road sign, wherein a correctness confidence value associated with the most likely supplementary information estimate exceeds a minimum correctness confidence threshold;

determining whether the most likely supplementary information estimate pertains to the first vehicle; and refraining from presenting extracted sign information and/or from adapting one or more vehicle functions, based on a determination that the most likely supplementary information estimate does not pertain to the first vehicle.

2. The method according to claim 1 wherein the capturing comprises additionally capturing first detected supplementary information from at least a portion of supplementary sign information assigned to the first road sign, and wherein the refraining from comprises refraining from the presenting extracted sign information and/or from the adapting one or more vehicle functions, based on a determination that the most likely supplementary information estimate does not pertain to the first vehicle and a detection confidence value associated with the first detected supplementary information is below a minimum detection confidence threshold.

3. The method according to claim 1
wherein the road sign and/or the first road sign comprises a speed limit sign;
wherein the sign information comprises a speed limit;
wherein the extracted sign information indicates a speed limit; and/or
wherein the adapting one or more vehicle functions comprises adapting a vehicle speed of the vehicle and/or the first vehicle.

4. The method according to claim 1 wherein the supplementary sign information comprises one or more validity restrictions of the sign information presented on the road sign and/or the first road sign, such as the supplementary sign information indicating that the sign information is valid only:
for vehicles having a weight exceeding a specified limit;
during a specified time range;
during specified weather conditions;
for trucks, busses, campers, vehicles with trailers, and/or the like;
for tractors;
for motorcycles; and/or
for vehicles other than cars.

5. The method according to claim 1 wherein the supplementary sign information is presented on a sign separate from, but in direct proximity of, the road sign and/or the first road sign.

6. A sign pertinence receiving system for use on-board a first vehicle to enable the first vehicle to discard non-pertinent road sign information, the first vehicle being configured to present extracted sign information within the first vehicle and/or adapt one or more vehicle functions based on detected sign information captured by means of one or more image capturing devices on-board the first vehicle from at least a portion of sign information presented on a road sign detectable by the first vehicle, the sign pertinence receiving system comprising:

a sign information capturing unit configured to capture first detected sign information from a first road sign;

an estimate receiving unit configured to receive a most likely supplementary information estimate indicating supplementary information deemed to pertain to the first road sign, which most likely supplementary information estimate is based on detected supplementary information captured by at least one second vehicle from supplementary sign information assigned to the first road sign, wherein a correctness confidence value associated with the most likely supplementary information estimate exceeds a minimum correctness confidence threshold;

a pertinence determining unit configured to determine whether the most likely supplementary information estimate pertains to the first vehicle; and a refraining unit configured to refrain from presenting extracted sign information and/or from adapting one or more vehicle functions, based on a determination that the most likely supplementary information estimate does not pertain to the first vehicle.

7. The sign pertinence receiving system according to claim 6 wherein the sign information capturing unit further is configured to capture first detected supplementary information from at least a portion of supplementary sign information assigned to the first road sign, and wherein the refraining unit further is configured to refrain from the presenting extracted sign information and/or from the adapting one or more vehicle functions, based on a determination that the most likely supplementary information estimate is determined to not pertain to the first vehicle and a detection confidence value associated with the first detected supplementary information is below a minimum detection confidence threshold.

8. The sign pertinence receiving system according to claim 6
wherein the road sign and/or the first road sign comprises a speed limit sign;
wherein the sign information comprises a speed limit;
wherein the extracted sign information indicates a speed limit; and/or
wherein the adapting one or more vehicle functions comprises adapting a vehicle speed of the vehicle and/or the first vehicle.

9. The sign pertinence receiving system according to claim 6 wherein the supplementary sign information comprises one or more validity restrictions of the sign information presented on the road sign and/or the first road sign, such as the supplementary sign information indicating that the sign information is valid only:
for vehicles having a weight exceeding a specified limit;
during a specified time range;
during specified weather conditions;
for trucks, busses, campers, vehicles with trailers, and/or the like;
for tractors;
for motorcycles; and/or
for vehicles other than cars.

10. The sign pertinence receiving system according to claim 6 wherein the supplementary sign information is presented on a sign separate from, but in direct proximity of, the road sign and/or the first road sign.

11. A vehicle comprising at least a portion of a sign pertinence receiving system according to claim 6, the vehicle being configured to present extracted sign information within the vehicle and/or adapting one or more vehicle functions based on detected sign information captured by means of one or more image capturing devices on-board the vehicle from at least a portion of sign information presented on a road sign detectable by the vehicle.

12. A non-transitory computer readable medium having stored computer executable instructions which, when executed in a sign pertinence receiving system on-board a first vehicle for enabling the first vehicle to discard non-pertinent road sign information, the first vehicle being configured to present extracted sign information within the first vehicle and/or adapt one or more vehicle functions based on detected sign information captured by one or more image capturing devices on-board the first vehicle from at least a portion of sign information presented on a road sign detectable by the first vehicle, cause the system to:

capture first detected sign information from a first road sign;

receive a most likely supplementary information estimate indicating supplementary information deemed to pertain to the first road sign, which most likely supplementary information estimate is based on detected supplementary information captured by at least one second vehicle from supplementary sign information assigned to the first road sign, wherein a correctness confidence value associated with the most likely supplementary information estimate exceeds a minimum correctness confidence threshold;

determine whether the most likely supplementary information estimate pertains to the first vehicle; and refrain from presenting extracted sign information and/or from adapting one or more vehicle functions, based on a determination that the most likely supplementary information estimate does not pertain to the first vehicle.

* * * * *